US011010701B2

(12) United States Patent
Troiani

(10) Patent No.: US 11,010,701 B2
(45) Date of Patent: May 18, 2021

(54) SYSTEM AND METHOD FOR MANAGING SALES MEETINGS

(71) Applicant: salesforce.com, inc., San Francisco, CA (US)

(72) Inventor: Emanuela Troiani, Dublin (IE)

(73) Assignee: salesforce.com, inc., San Francisco, CA (US)

(*) Notice: Subject to any disclaimer, the term of this patent is extended or adjusted under 35 U.S.C. 154(b) by 763 days.

(21) Appl. No.: 13/874,205

(22) Filed: Apr. 30, 2013

(65) Prior Publication Data
US 2013/0290059 A1 Oct. 31, 2013

Related U.S. Application Data

(60) Provisional application No. 61/640,504, filed on Apr. 30, 2012.

(51) Int. Cl.
G06Q 10/06 (2012.01)
G06Q 10/10 (2012.01)

(52) U.S. Cl.
CPC ... *G06Q 10/06315* (2013.01); *G06Q 10/1095* (2013.01)

(58) Field of Classification Search
CPC . G06Q 10/00; G06Q 2220/00; G06Q 2230/00
USPC .............................................. 705/7.11–7.42
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,732,399 A * | 3/1998 | Katiyar ............. G06Q 10/1093 705/7.18 |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,842,009 A * | 11/1998 | Borovoy ............. G06Q 10/109 |
| 5,873,096 A | 2/1999 | Lim et al. |
| 5,918,159 A | 6/1999 | Fomukong et al. |
| 5,963,953 A | 10/1999 | Cram et al. |
| 6,034,621 A * | 3/2000 | Kaufman ............... G06Q 99/00 340/7.21 |
| 6,092,083 A | 7/2000 | Brodersen et al. |
| 6,161,149 A | 12/2000 | Achacoso et al. |
| 6,169,534 B1 | 1/2001 | Raffel et al. |

(Continued)

Primary Examiner — Rutao Wu
Assistant Examiner — Sarjit S Bains
(74) Attorney, Agent, or Firm — Sterne, Kessler, Goldstein & Fox P.L.L.C.

(57) ABSTRACT

The technology disclosed relates to helping sales engineers prepare for sales meetings. In particular, it relates to intelligently and automatically creating packages of information related to sales meetings. The information packages are stored in on-demand systems that are accessible by a plurality of devices used by the sales engineer.
The technology disclosed also relates to providing sales engineers offline access to the information packages related to the sales meetings. The information packages can be assembled from and deployed to a plurality of electronic sources and devices based on the sales engineer's needs, criteria, assignments and preferences.

14 Claims, 8 Drawing Sheets

Meeting Packager Environment

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,640,230 B1 * | 10/2003 | Alexander ........... G06Q 10/107 |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,266,508 B1 * | 9/2007 | Owen et al. ................ 705/7.13 |
| 7,289,976 B2 | 10/2007 | Kihneman et al. |
| 7,299,405 B1 * | 11/2007 | Lee ........................ G06Q 10/10 715/700 |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,326,831 B1 * | 12/2012 | Aguera y Arcas ......................... G06F 16/9537 707/733 |
| 8,457,545 B2 | 6/2013 | Chan |
| 8,484,111 B2 | 7/2013 | Frankland et al. |
| 8,489,442 B1 * | 7/2013 | Mohler ............... G06Q 10/109 705/7.12 |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 8,812,029 B1 * | 8/2014 | Cao et al. .................. 455/456.3 |
| 9,165,260 B1 * | 10/2015 | Olmsted ............... G06Q 10/109 |
| 2001/0044791 A1 | 11/2001 | Richter et al. |
| 2002/0072951 A1 | 6/2002 | Lee et al. |
| 2002/0078079 A1 * | 6/2002 | Rangan ............... G06F 17/3089 715/200 |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0009430 A1 * | 1/2003 | Burkey ............ G06F 17/30699 |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0115311 A1 * | 6/2003 | Johnston-Watt et al. ...... 709/223 |
| 2003/0120675 A1 | 6/2003 | Stauber et al. |
| 2003/0144873 A1 * | 7/2003 | Keshel ................. G06Q 30/02 705/1.1 |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0038869 A1 * | 2/2005 | Zimler et al. ................. 709/217 |
| 2005/0050555 A1 | 3/2005 | Exley et al. |
| 2005/0091098 A1 | 4/2005 | Brodersen et al. |
| 2005/0197871 A1 * | 9/2005 | Mendonca et al. ............... 705/7 |
| 2005/0222890 A1 * | 10/2005 | Cheng ................. G06Q 10/109 705/7.19 |
| 2006/0021019 A1 | 1/2006 | Hinton et al. |
| 2006/0129691 A1 * | 6/2006 | Coffee et al. ................. 709/230 |
| 2006/0176524 A1 * | 8/2006 | Willrich ....................... 358/474 |

(56) References Cited

U.S. PATENT DOCUMENTS

| | | | |
|---|---|---|---|
| 2007/0016646 A1* | 1/2007 | Tendjoukian | G06Q 10/109 709/206 |
| 2007/0226032 A1* | 9/2007 | White et al. | 705/9 |
| 2007/0276719 A1* | 11/2007 | Franco | G06Q 10/06311 705/7.13 |
| 2008/0117201 A1* | 5/2008 | Martinez | G06F 17/30035 345/418 |
| 2008/0249972 A1 | 10/2008 | Dillon | |
| 2009/0006608 A1* | 1/2009 | Gupta | G06Q 10/10 709/224 |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2009/0282125 A1* | 11/2009 | Jeide | H04L 67/1095 709/217 |
| 2009/0293013 A1* | 11/2009 | O'Shaugnessy | G06F 3/0485 715/810 |
| 2010/0153113 A1* | 6/2010 | Kiefer et al. | 704/258 |
| 2010/0174816 A1* | 7/2010 | Piccinini | H04L 12/2859 709/227 |
| 2010/0211575 A1* | 8/2010 | Collins | G06F 16/489 707/749 |
| 2010/0223581 A1* | 9/2010 | Manolescu | G06Q 10/00 715/853 |
| 2010/0241623 A1* | 9/2010 | Acker | G06F 17/3087 707/724 |
| 2011/0218958 A1 | 9/2011 | Warshavsky et al. | |
| 2011/0247051 A1 | 10/2011 | Bulumulla et al. | |
| 2012/0042218 A1 | 2/2012 | Cinarkaya et al. | |
| 2012/0185291 A1* | 7/2012 | Ramaswamy | H04L 12/1818 705/7.19 |
| 2012/0190386 A1* | 7/2012 | Anderson | G01S 19/14 455/456.3 |
| 2012/0198343 A1* | 8/2012 | Hirvonen | G06F 3/0605 715/734 |
| 2012/0233137 A1 | 9/2012 | Jakobson et al. | |
| 2012/0290407 A1 | 11/2012 | Hubbard et al. | |
| 2013/0073387 A1* | 3/2013 | Heath | G06Q 30/02 705/14.53 |
| 2013/0145024 A1* | 6/2013 | Cao | H04L 67/22 709/224 |
| 2013/0166338 A1* | 6/2013 | Philipp | G06Q 10/06 705/7.13 |
| 2013/0212497 A1 | 8/2013 | Zelenko et al. | |
| 2013/0218888 A1* | 8/2013 | Seligmann | G06Q 10/109 707/736 |
| 2013/0247216 A1 | 9/2013 | Cinarkaya et al. | |
| 2013/0282417 A1* | 10/2013 | Gaedcke | G06Q 30/016 705/7.13 |
| 2013/0329527 A1* | 12/2013 | Alavala | H04W 4/02 368/10 |
| 2013/0332513 A1* | 12/2013 | Honda | H04L 67/42 709/203 |
| 2014/0012619 A1* | 1/2014 | Natarajan | H04L 51/32 705/7.19 |
| 2014/0040162 A1* | 2/2014 | McConnell et al. | 705/347 |
| 2014/0136493 A1* | 5/2014 | Subramanian | G06F 17/30138 707/693 |
| 2014/0214471 A1* | 7/2014 | Schreiner, III | G06Q 10/1095 705/7.19 |

\* cited by examiner

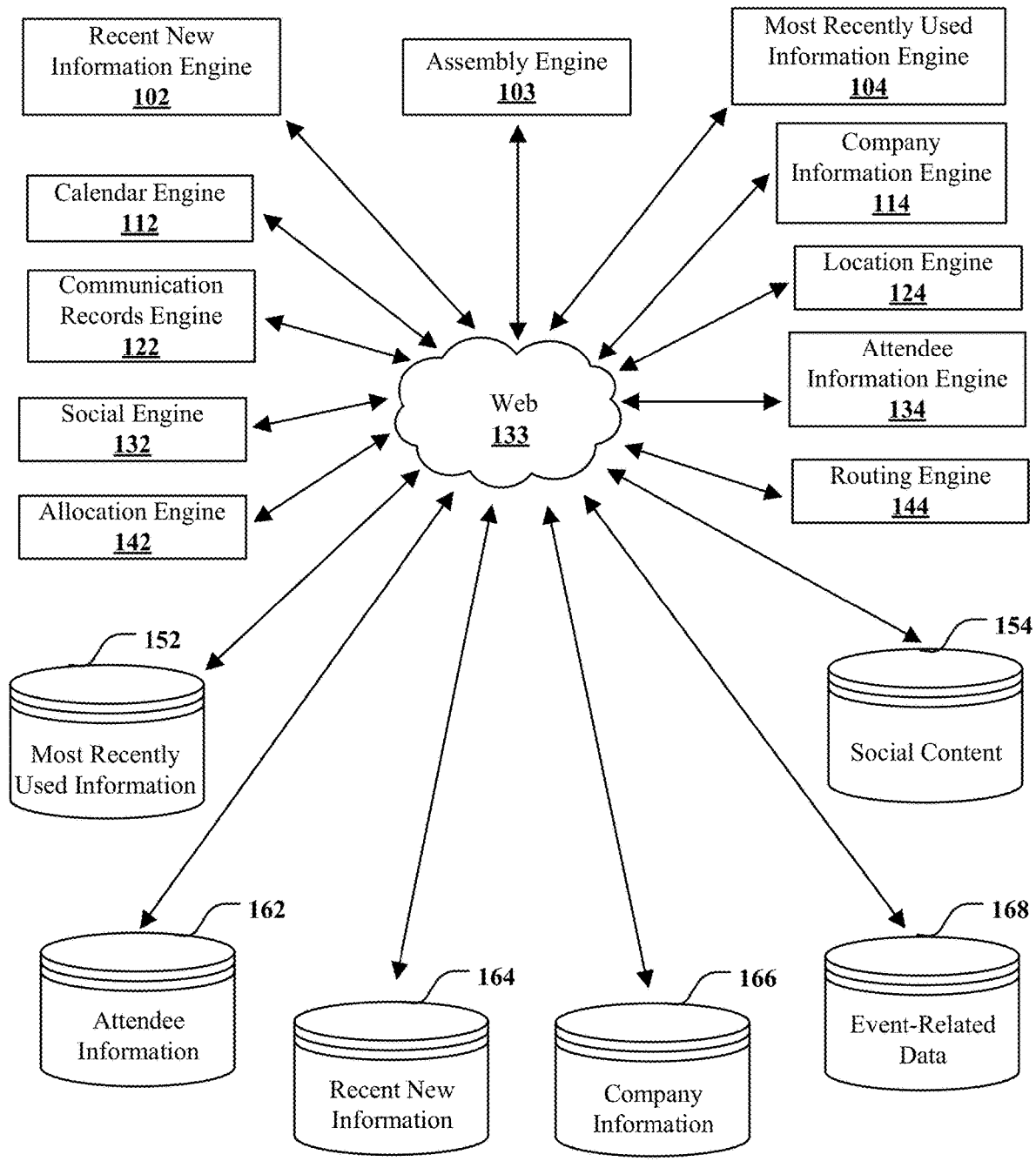
Fig. 1 – Meeting Packager Environment

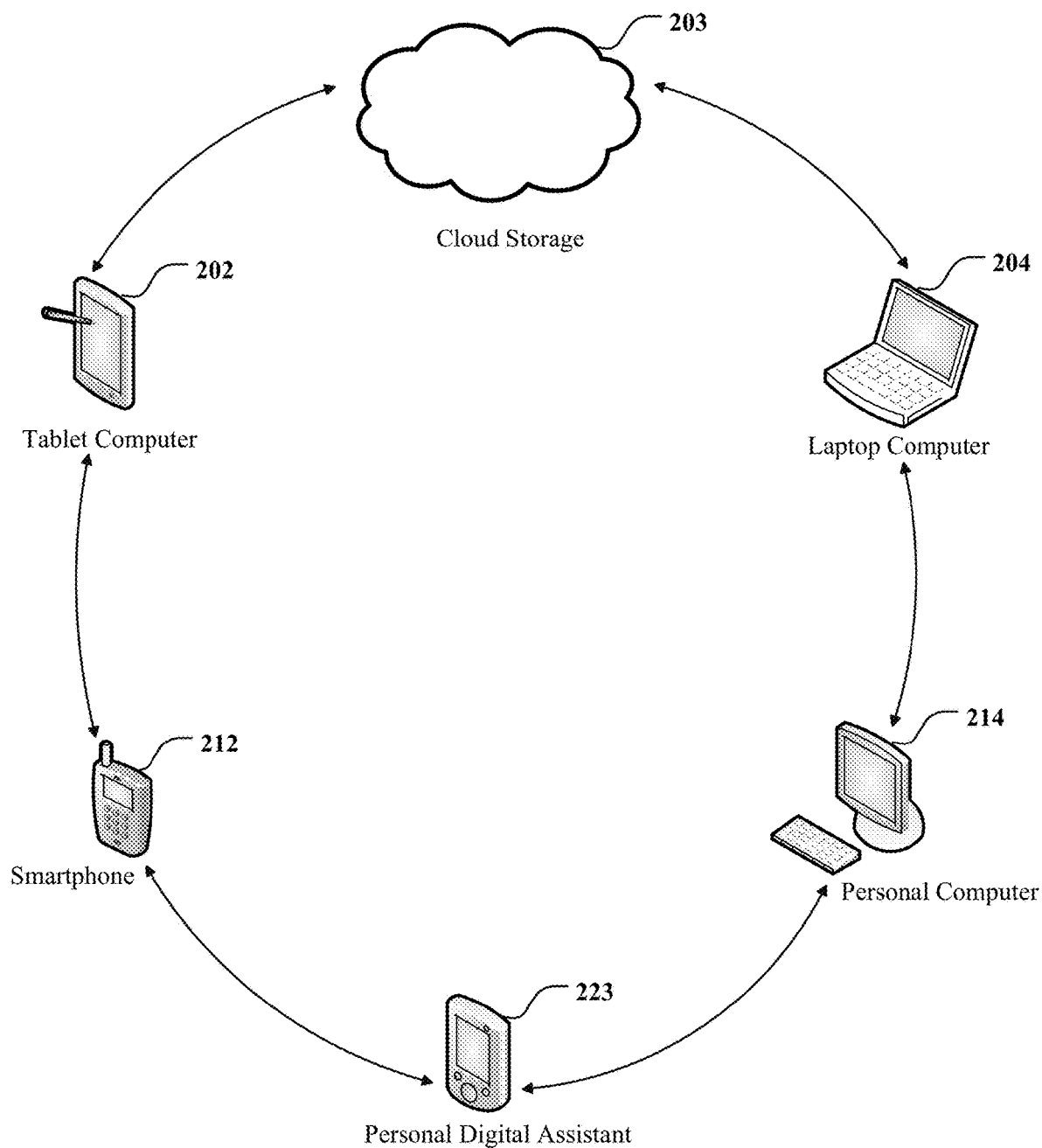
Fig. 2 – Electric Source Data Transfer

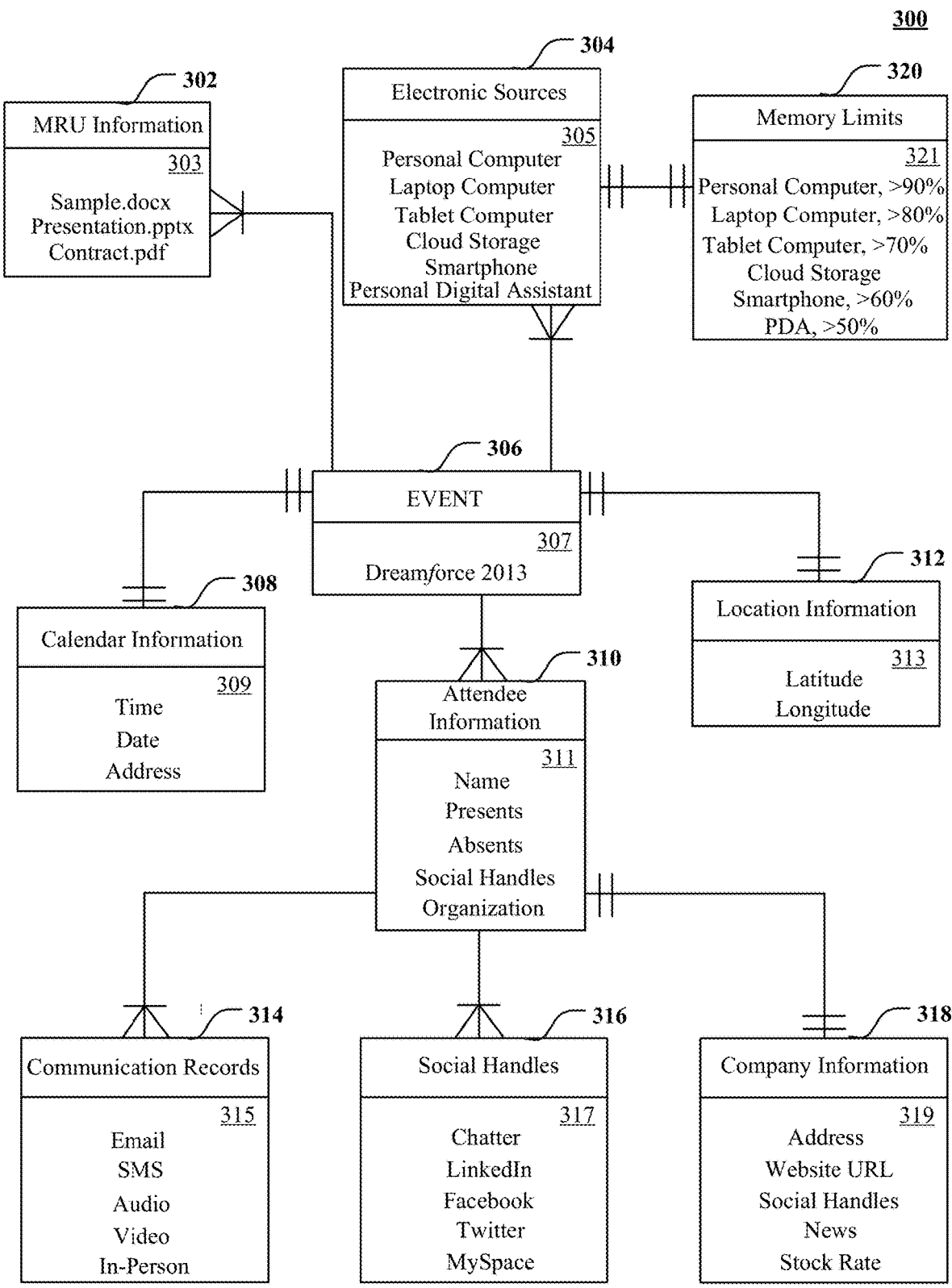
Fig. 3 — Event-Related Data Schema

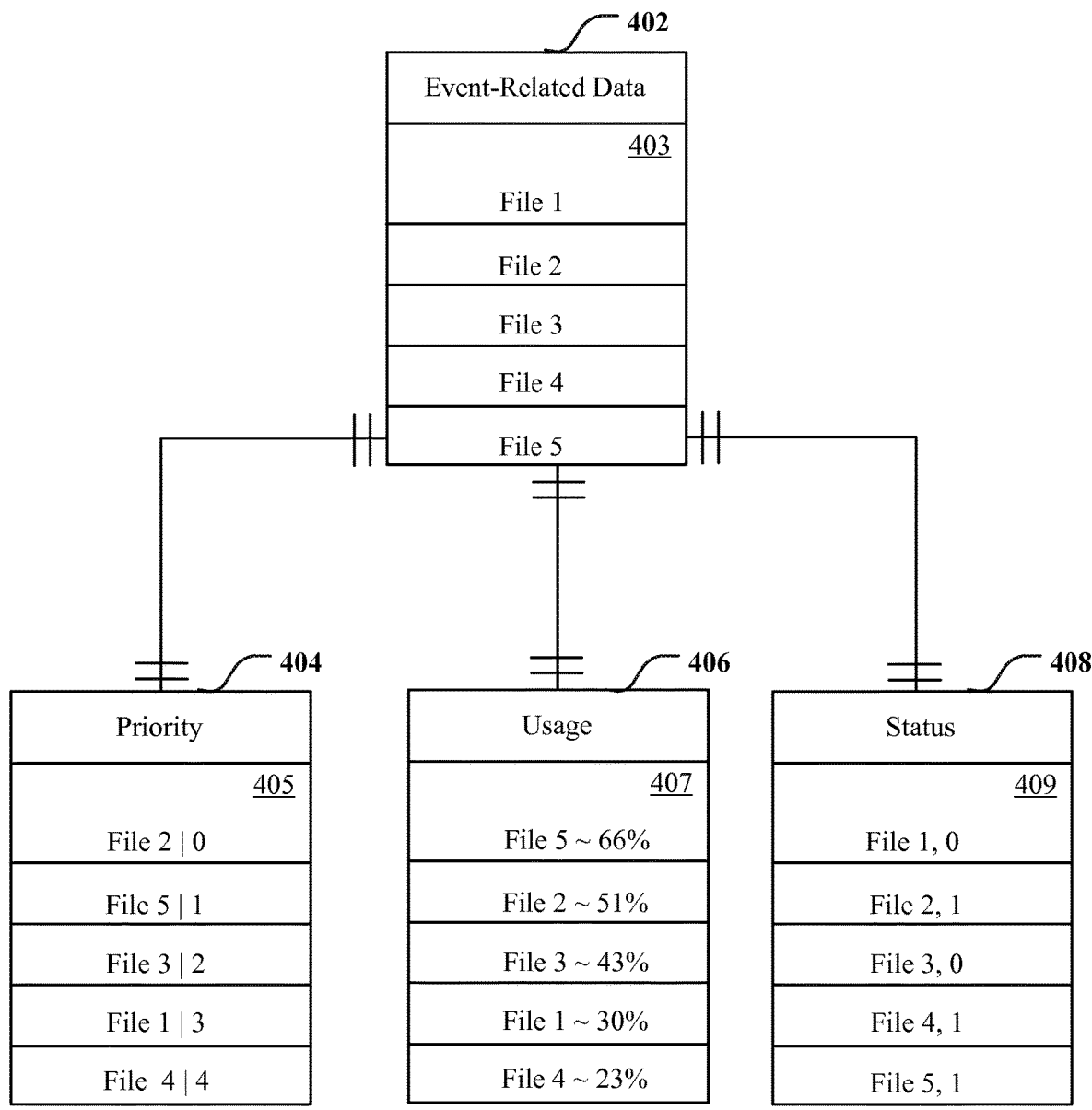
Fig. 4 – User Preferences and Usage Based Assignment of Event-Related Data

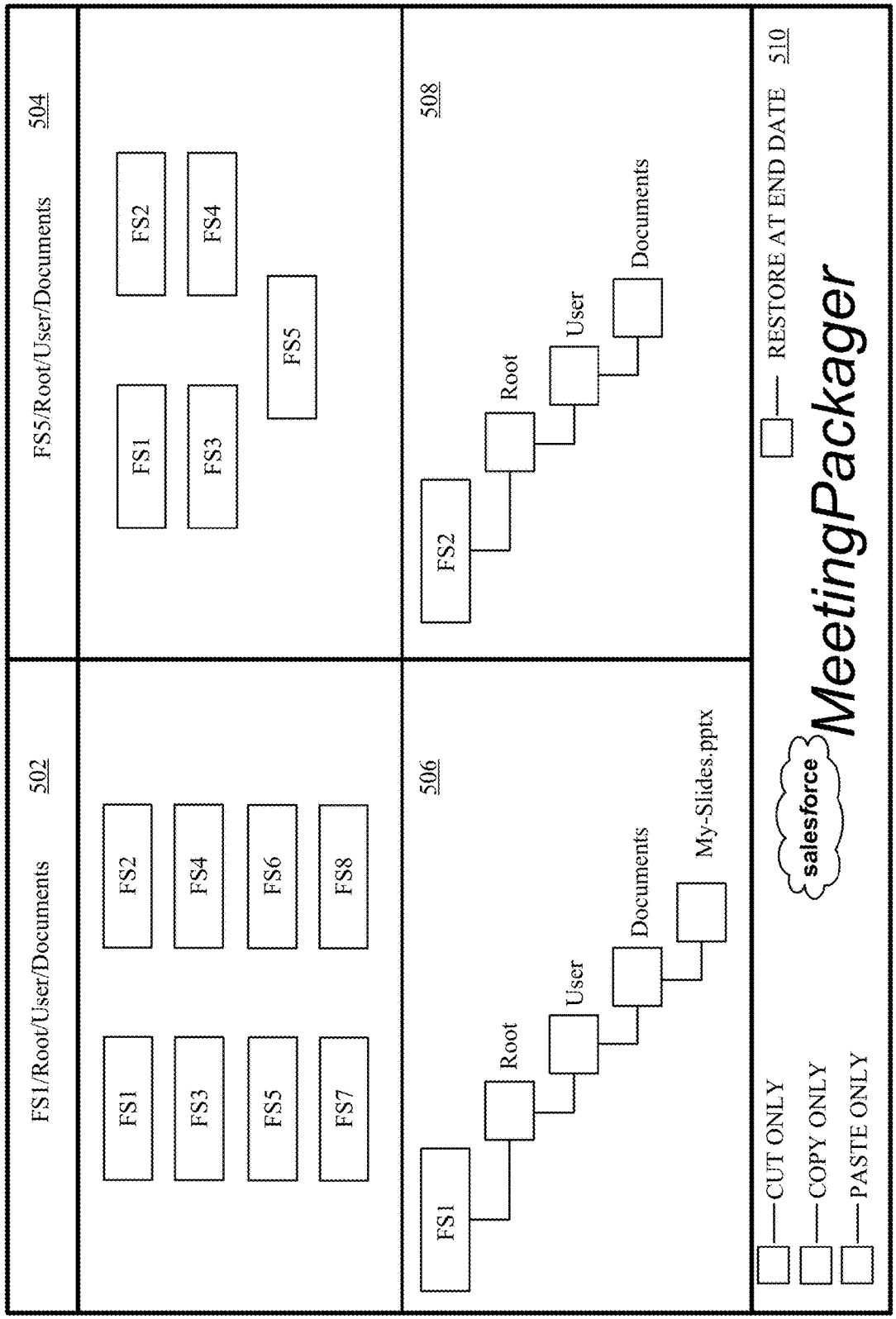
Fig. 5 – Customer Interface

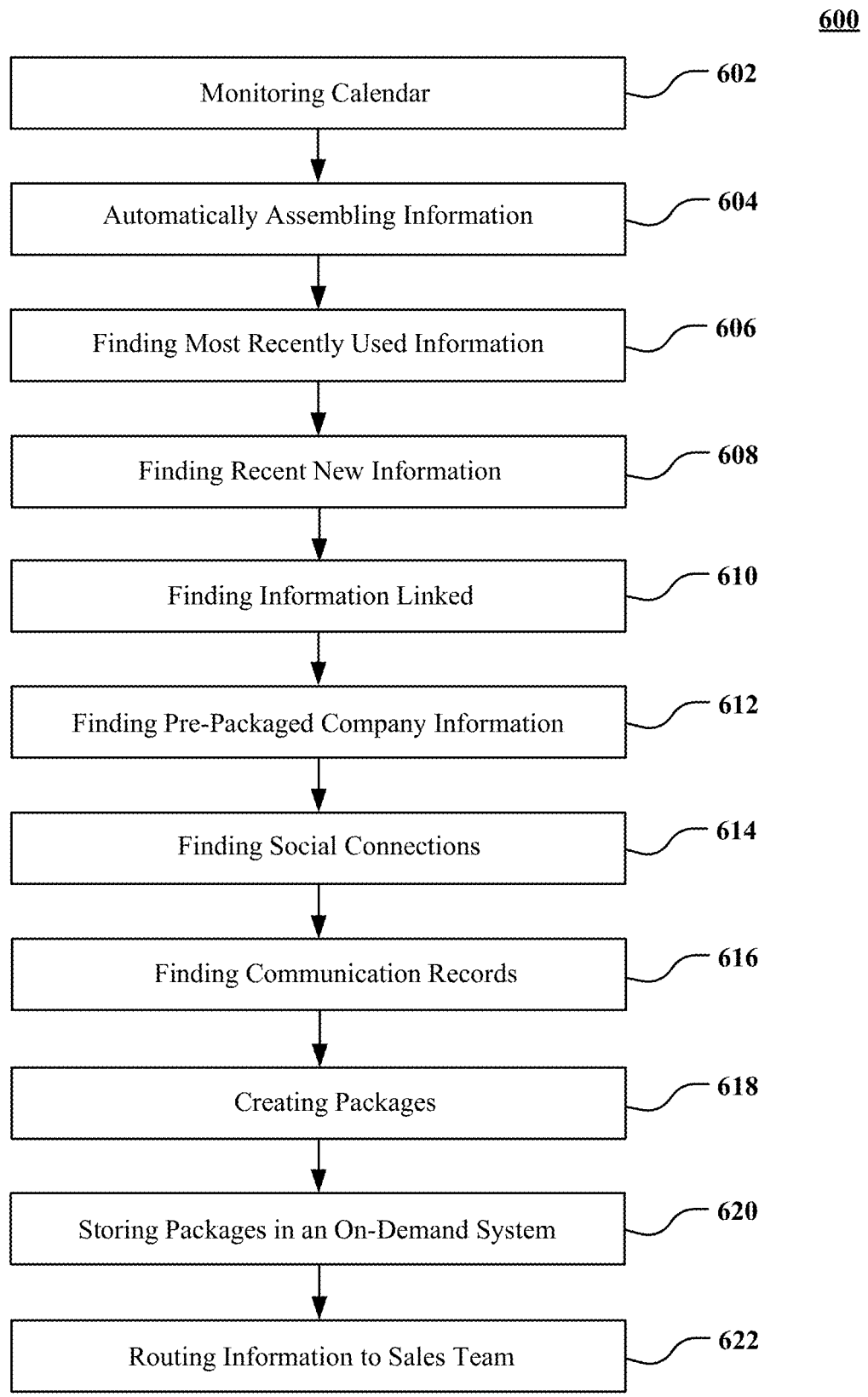
Fig. 6 – Calendar Based Meeting Packager

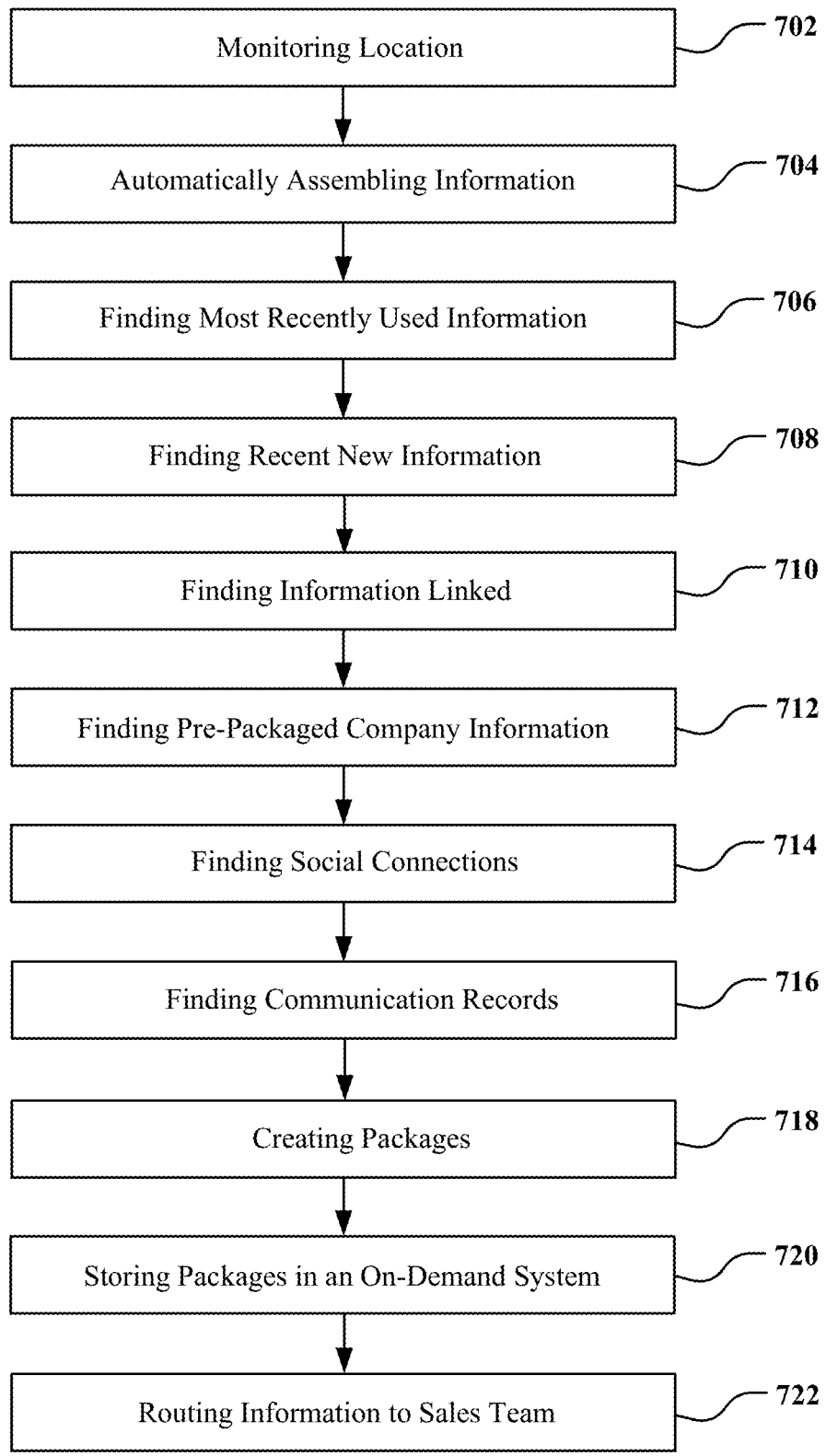
Fig. 7 – Location Based Meeting Packager

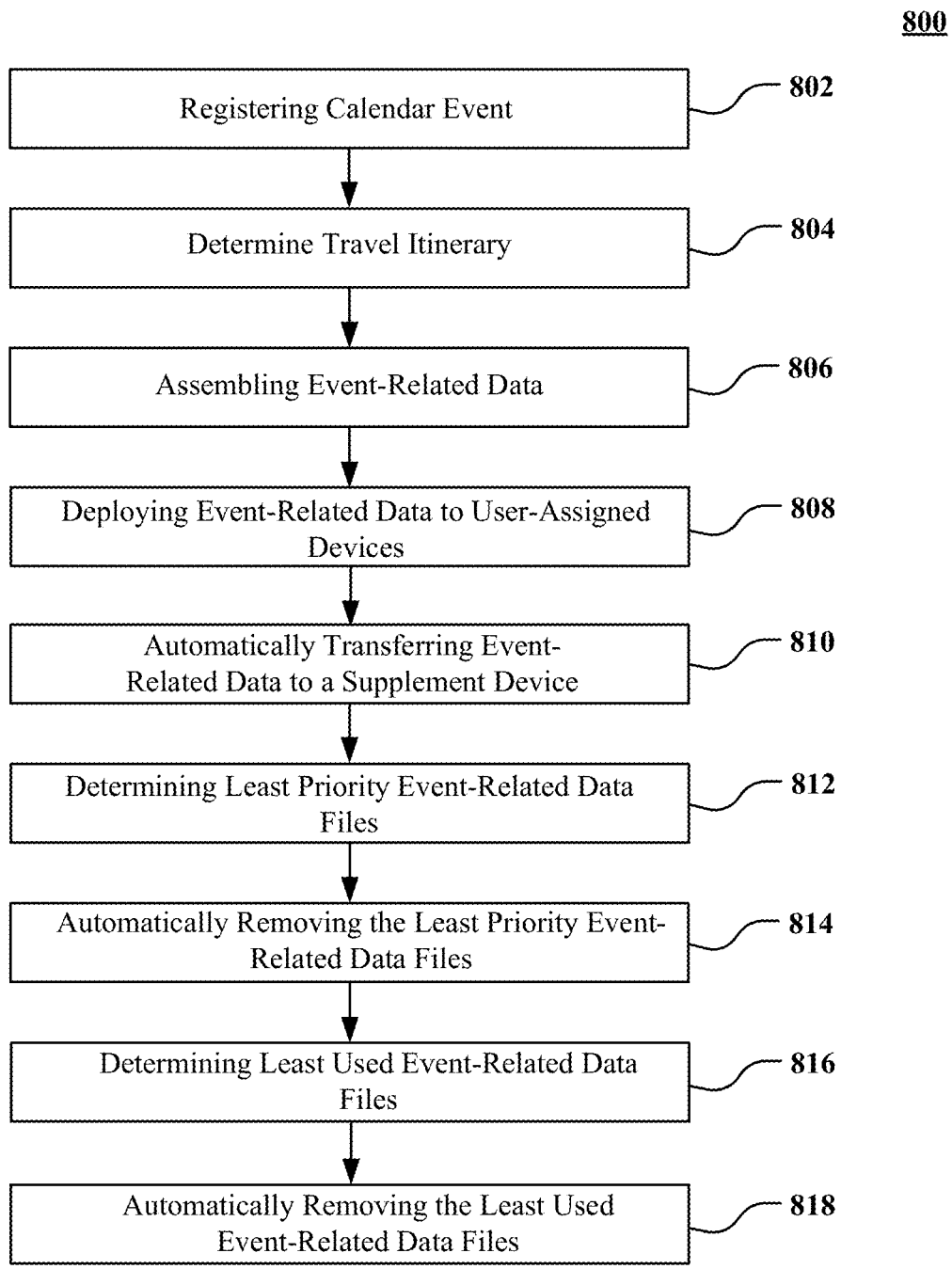
Fig. 8 – Data Deployment for Offline Access

SYSTEM AND METHOD FOR MANAGING SALES MEETINGS

RELATED APPLICATION

This application claims the benefit of U.S. Provisional Patent Application No. 61/640,504, entitled, "Methods and Systems for Data Management Across Heterogeneous Storages Systems," filed on 30 Apr. 2012. The provisional application is hereby incorporated by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

The technology disclosed relates to helping sales engineers prepare for sales meetings. In particular, it relates to intelligently and automatically creating packages of information related to sales meetings. The information packages are stored in on-demand systems that are accessible by a plurality of devices used by the sales engineer.

The technology disclosed also relates to providing sales engineers offline access to the information packages related to the sales meetings. The information packages can be assembled from and deployed to a plurality of electronic sources and devices based on the sales engineer's needs, criteria, assignments and preferences.

With increasing trend of individual users owning multiple devices, managing data consistently and intelligently across all the devices owned by a single user has become a big challenge. Moreover, with each device serving a different purpose, it has become imperative to provide artificial intelligence to data so that it can automatically be made available in the most appropriate device. Finally, providing offline access to data based on a user's preferences such as location, signal strength, and professional context is a problem that yet remains to be resolved.

Accordingly, it is desirable to provide systems and methods that offer a flexible approach to automatic allocation and deployment of appropriate data to the most suitable user device, thus allowing users to focus on more important tasks rather than data management.

An opportunity arises to automatically manage data across a plurality of heterogeneous devices based on user preferences. Improved user experience and higher customer satisfaction and retention may result.

SUMMARY

The technology disclosed relates to helping sales engineers prepare for sales meetings. In particular, it relates to intelligently and automatically creating packages of information related to sales meetings. The information packages are stored in on-demand systems that are accessible by a plurality of devices used by the sales engineer.

The technology disclosed also relates to providing sales engineers offline access to the information packages related to the sales meetings. The information packages can be assembled from and deployed to a plurality of electronic sources and devices based on the sales engineer's needs, criteria, assignments and preferences.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1 shows a block diagram of one implementation of a meeting-packager environment.

FIG. 2 illustrates one implementation of event-related data transfer between different electric sources.

FIG. 3 illustrates one implementation of a schema of event-related data.

FIG. 4 shows one implementation of a schema of event-related data based on user preferences and usage.

FIG. 5 shows one implementation of a customer interface for using the meeting packager.

FIG. 6 is a flow chart of one implementation of a calendar based meeting packager.

FIG. 7 is a flow chart of one implementation of a location based meeting packager.

FIG. 8 is a flow chart of one implementation of deploying event-related data for off-line access.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The technology disclosed relates to automatically and intelligently creating packages of information related to a sales meeting. It further relates to automatically allocating and deploying the packaged information based on the sales engineer's preferences.

In some implementations, the technology disclosed can monitor a sales engineer's calendar and identify a calendar event. In other implementations, it can monitor the sales engineer's location and identify an event location. The event location can be set in response to a user selection across a user interface, which can be triggered by real-time GPS reporting enabled in one of the devices owned by the sales engineer. It can further automatically assemble event-related data from various electronic sources assigned by the sales engineer. The assembling of event-related data can be initiated by a trigger date or trigger location specified by the sales engineer.

The event-related data can be then assembled as information packages. These information packages can further be stored in an on-demand system accessible by multiple user devices owned by the sales engineer. In some implementations, the event-related data can be transferred to one or more electronic sources based user assignments and preferences such as file type, file priority, file usage, file status, file size, etc. In other implementations, the event related data can be routed to other users specified by the sales engineer or members of a sales team.

In some implementations, the technology disclosed can automatically deploy event-related data in time for off-line access during travel. It can register a calendar event in response to a user selection across a user interface of a user device such as a personal computer, laptop computer, tablet computer, smartphone, etc. The calendar event can specify one or more event attributes such as data related to the event, references to electronic sources storing the data related to the event, location of the event, time and date of the event, and attendees at the event.

In some implementations, the technology disclosed can automatically determine the sales engineer's travel itinerary from his or her calendar and further calculate the required travel time to reach an event. Based on the travel itinerary and travel time, the event-related data can be deployed to one or more assigned devices as a trigger date is reached in advance of travel to the event.

In some implementations, the technology disclosed can categorize event-related data files based on various criteria set by the sales engineer. These criteria can include a file priority criteria, file usage criteria, file status criteria, file size criteria, etc. It can further deploy the event-related data based on these criteria to one or more user assigned devices.

The technology disclosed relates to managing sales meeting for use in a computer-implemented system. The described subject matter can be implemented in the context of any computer-implemented system, such as a software-based system, a database system, a multi-tenant environment, or the like. Moreover, the described subject matter can be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Meeting-Packager Environment

FIG. 1 shows a block diagram of one implementation of a meeting-packager environment 100. FIG. 1 also shows that meeting-packager environment 100 can include different types of engines to generate information that can be useful during a sales meeting. In some implementations, these engines can be recent new information engine 102, assembly engine 103, most recently used (MRU) information engine 104, calendar engine 112, company information engine 114, communication records engine 122, location engine 124, social engine 132, and attendees information engine 134. It further can include an allocation engine 142 and routing engine 144.

In some implementations, the information generated from these engines can be stored in various data repositories such as most recently used information 152, social content 154, attendees information 162, recent new information 164, company information 166, and event-related data 168. The different engines of environment 100 can crawl the web 133 and store the mined data in various data repositories. In other implementations, environment 100 may not have the same elements as those listed above and/or may have other/different elements instead of, or in addition to, those listed above.

Regarding different types of engine, recent new information engine 134 can crawl the web 133 to find information related to a company at a sales meeting including latest news articles, stock rates, etc. The found recent new information related to the company can be stored in the data repository 164. This information can help a sales engineer to stay updated with the recent activities of a prospective or current client.

The most recently used information engine 104 can query the content repository 152 using the web 133 and identify content related to an instant client that was most recently accessed by a user. In some implementations, the technology disclosed can identify most recent information accessed from one or more devices such as a laptop computer, tablet computer, smartphone, etc. The most recently used information engine 104 can also receive user preferences from a sales engineer to query most recently used information from a particular device assigned by the sales engineer. In other implementations, the most recently used information 152 can include content such as documents, images, videos, etc. related to the company at the sales meeting. This can allow a sales engineer to quickly and efficiently access information associated with an instant client.

The calendar engine 112 can extract information related to an event such as the time, date, addresses, etc. of the event from one or more devices accessible through web 133. In some implementations, the extracted information can be stored in the event-related data repository 168. The event-related data can be further used to automate several processes for a user, as explained later in this application.

The company information engine 114 can search the web 133 to find information related to a company at a sales meeting such as a company's website, contact information, web mentions, etc. This information can be stored in the content repository 166 for access by a sales engineer.

The communications records engine 122 can present a sales engineer with communication records between the sales engineer and his or her instant client. The communication records can include e-mails, phone calls, SMSs, etc. exchanged between the sales engineer and the client. In some implementations, the technology disclosed can filter these communication records based on a particular sales deals, events, individuals, calendar events, etc. It can also receive user preferences from the sales engineer to search communication records from a specific user assigned device such as a smartphone or a specific email client like Outlook. In other implementations, these communication records can be stored in content repository 168.

The location engine 124 can identify location information associated with a sales meeting or any calendar event. The location information can include latitude and longitude co-ordinates of a user assigned venue. This information can be stored in the content repository 168. The location engine 124 can present a sales engineer with this location information across a user interface through a GPS or GNSS based application.

The social engine 132 can crawl various person-related data sources such as access controlled application-programming interfaces (APIs), public internet and social networking sites to find any common social connections between a sales engineer and attendees at a sales meeting. The retrieved social connections can be stored in the social content repository 154.

The attendees information engine 134 can extract business-to-business contacts of attendees at a sales meeting from a master database. In some implementations, these contacts can be searched on various public-related data sources to determine if social handles or profiles associated with business-to-business contacts of the attendees exist within those sources. If the sources provide positive matches to any of the contacts, the attendee information engine 134 can store the retrieved social handles or profiles in a content repository 162.

The assembly engine 103 can assemble all the found information as packages for unified access by a sales engineer. In some implementations, it can assemble the found information based on user preferences such as client type, location of the sales meeting, priority criteria, context of the sales meeting, product type, product lifecycle, contractual requirements, stages of a business deal, etc.

The allocation engine 142 can allocate the information packages to on-demand systems accessible by one or more user assigned devices. For instance, location information can be allocated Salesforce.com multi-tenant database (MTDB) accessible to a sales engineer's smartphone device. In another example, content such as product presentations can be made accessible through a tablet computer owned by the sales engineer.

The routing engine 144 can identify other members of a sales team associated with the sales engineer or the sales meeting and forward the found information or packages to one or members based on a user assignment. For example, the sales engineer can forward all contractual documents related to a sales meeting to members of the legal department of his or her organization. In another example, the sales engineer can forward all marketing material related to a prospective client to members of the design department of his or her organization.

Inter-Device Data Transfer

FIG. 2 illustrates one implementation of event-related data transfer 200 between different electric sources. FIG. 2 shows different electronic sources accessible by a sales engineer including a tablet computer 202, cloud storage 203, laptop computer 204, smartphone 212, personal computer 214, and personal digital assistant 223. In other implementations, transfer 200 may not have the same electronic sources as those listed above and/or may have other/different electronic sources instead of, or in addition to, those listed above. In some implementations, transfer 200 can include servers, networking devices, notebook computers, digital image capture devices and the like.

In some implementations, the technology disclosed can automate transfer of event-related data between one or more electronic sources based on user assignment and preferences. Such user assignment and preferences can be priority, usage, status based criteria as explained later in this application.

When an event-related data file meets a user assigned criteria, the file can be transferred from a source device to a destination device. In some implementations, the sales engineer can specify data transfer based on the file and device types. In one example, the technology disclosed can transfer files with ".docx" extension to laptop computer 204 and move file with ".pptx" extension to tablet computer 202. In another implementation, the sales engineer can specify a backup supplemental device for transferring data when a first or primary device reaches a memory limit. For example, when smartphone 212 hits a memory limit, one or more data files can be transferred to cloud storage 203 based on file types, file sizes, file priority, file usage, file status, etc.

Event-Related Data Schema

FIG. 3 illustrates one implementation of a schema 300 of event-related data. FIG. 3 shows that schema 300 can include an event table 306. In some implementations, event table 306 can be associated with a calendar information table 308, attendee information table 310, location information table 312, MRU information table 302, and electronic sources table 304. The attendee information table 310 can be further associated with a communication records table 314, social handles table 316 and company information table 318. The electronic sources table 304 can be further associated with a memory limits table 320. In other implementations, schema 300 may not have the same tables or fields as those listed above and/or may have other/different tables or fields instead of, or in addition to, those listed above.

Once a user creates a calendar event like "Dreamforce 2012" by making a selection across a user interface of a calendar application, the technology disclosed can register that event in the event table 306 as field 307. It can further extract one or more event attributes and store them in various tables. For instance, an event attribute such as calendar information can be stored in a calendar information table 308 that can include one or more calendar related fields 309 such as time, date, address, etc.

In some implementations, an attendee information table 310 can include fields 311 like name, presents, absents, social handles, and organization to store information related to the attendees at the event. The communication records table 314 can store any communication exchanges between a sales engineer and a client such as emails, SMS, telephonic conversations, video conferences, etc. as various fields 315. The social handles table 316 can include fields 317 that represent social profiles of the attendees at the event and social connections common between the sales engineer and the client. The company information table 318 can include information related to a company that the sales engineer visits or a company present at the event. This information can be stored as fields 319 such as address, website URL, social handles, news, and stock rate.

Similarly, a location information table 312 can include latitude and longitude fields that can represent the location of the event on a map. The most recently used (MRU) information table 302 can include the latest content related to a particular company accessed by a sales engineer such as documents, presentations, videos, etc.

In some implementations, the technology disclosed can present the MRU information to a sales engineer based on filters, triggers, approval processes, preferences, etc. applied by the sales engineer. For example, a sales engineer can specify a latest date like "1 Jan. 2013" and a company department such as "legal" to store legal contracts and other related documents from and after 1 Jan. 2013 in the MRU information table 302.

The electronic sources table 304 can specify the data sources as fields 305 that store the data related to an event. For example, the technology disclosed can package videos related to "Dreamforce 2013" from the sales engineer's personal computer 214 and further package power-point presentations of the event from the sales engineer's tablet computer 202.

In some implementations, a memory limits table 320 can be associated with the electronic sources table 304 to specify the memory limit on devices after which data transfers to other devices or sources may occur. In some implementations, when an event is registered, the technology disclosed can use triggers to initiate the corresponding data deployment drill. Triggers can act as scripts that execute before or after specific data manipulation language (DML) events occur, such as before object records are inserted into the database, or after records have been deleted.

In some implementations, the technology disclosed can use workflow rules to automate one or more actions based on user assignment and preferences such as transferring files with certain file types to specific device types. In other implementations, approval processes can be used to receive approval from a sales engineer or an administrator regarding any data transfer. For instance, the sales engineer can use triggers and workflow rules to specify that if the person digital assistant 223 reaches an fifty percent memory limit, then one or more previously stored data files can be transferred to a backup supplemental device like personal computer 214 assigned by the sales engineer.

FIG. 4 shows one implementation of a schema 400 of event-related data based on user preferences and usage. The event-related data can be categorized as event-related data files 1-5 403 in the event-related data table 402. In some implementations, the technology disclosed can allow a sales engineer to tag event-related data 402 based on various criteria such as priority 404, usage 406, status 408, etc.

In some implementations, the technology disclosed can receive user customizations from the sales engineer to arrange the event-related data files 1-5 403 based on the sales engineer's need. The prioritized files can be stored in the priority criteria table 405 and assigned numerical values to indicate a file's priority. For example, file 2 with priority value 0 can have the highest priority and file 4 with priority value 1 can have the least priority. In other implementations, the event-related data files 1-5 403 can be arranged in the usage criteria table 406 based on the sales engineer's usage. For instance, files 1-5 403 can be arranged in ascending or descending order based on the amount of file usage.

In some implementations, the priority criteria table 405 can be used to customize transfer of event-related data files between data storage devices. For example, files with highest priority may not be automatically transferred from a first device to a supplementary backup device when the first device reaches a memory limit. Likewise, the usage criteria table 406 can be used to prevent transfer of event-related data files that are used most often by the sales engineer. For example, when the first device hits a memory limit, the files with low usage value can be transferred before the files with high usage value.

In some implementations, the status criteria table 408 can use numerical flags like 0 or 1 to place status-locks on event-related data files 1-5. If a file's status is 1, the file can be locked and not transferred to a supplementary backup device when the first device reaches a memory limit. On the other hand, if a file's status is 0, then it may not be locked and can be moved to the backup device during a memory shortage.

Customer Interface

FIG. 5 shows one implementation of a customer interface 500 for using the meeting packager. FIG. 5 shows that the customer interface 500 can include device views 502, 504, 506, and 508 and different file transfer operations 510. In other implementations, customer interface 500 may not have the same widgets or as those listed above and/or may have other/different widgets instead of, or in addition to, those listed above.

The customer interface 500 can provide an interface or dashboard for the customer to interact with the meeting packager environment 100. In some implementations, device view 502 can provide access to file systems FS1-FS8 of various source user devices 202, 203, 204, 212, 214, and 223. The device view 504 can serve as the interface gateway to file systems FS1-FS5 of different destination devices 202, 203, 204, 212 and 214.

Furthermore, device views 506 and 508 can provide a detailed view of file system FS1 and FS2 so as to allow a sales engineer access to a particular file in a specific folder, such as "My-Slides.pptx" in the "Documents" folder of file system FS1. In some implementations, the technology disclosed can allow the sales engineer to transfer an event-related data file from a source file system to a destination file system by a drag and drop operation. For instance, the sales engineer can transfer a document related to a client from his or her person computer 214 to a tablet computer 202 using the drag and drop operation of customer interface 500.

In some implementations, a sales engineer can use file transfer operations 510 like "CUT ONLY", "COPY ONLY" and "PASTE ONLY" to move a data file between the file systems FS1-FS8 of various user devices 202, 203, 204, 212, 214, and 223. In other implementations, the sales engineer can use the "RESTORE AT END DATE" to restore the file systems FS1-FS8 to a previous date and undo any data transfer operations.

In some implementations, the sales engineer can use the customer interface 500 to make a unified content search across the file systems FS1-FS8 of various source user devices 202, 203, 204, 212, 214, and 223. In other implementations, the sales engineer can apply filters to the unified searches such as client type, location of the sales meeting, priority criteria, context of the sales meeting, product type, product lifecycle, contractual requirements, stages of a business deal, etc. For instance, the sales engineer can search a high priority client-specific document in his personal computer 214, laptop computer 204, tablet computer 202, smartphone 212, etc. all at the same time via the customer interface 500.

The dashboard interface can allow the customer to interact with event-related data using screen-based objects. In some implementations, the customer interface 500, as a dashboard interface, can be a hosted software service accessible via an Internet web browser and function as a primary interface used by the customer to monitor, analyze, and engage file systems FS1-FS8.

In some implementations, the customer interface 500, as an engagement console, can be a computer desktop application primarily used for team-based workflow of social media content engagement. The engagement console can present file systems FS1-FS8 as configurable "stacks" such that customer can create new file systems or modify existing file systems FS1-FS8 by drag and drop operation. These stacks can also support various filters and execution of workflow macros allowing customers to assign rules and triggers to the flow of event-related data.

Calendar Based Meeting Packager

FIG. 6 is a flow chart 600 of one implementation of calendar based meeting packager. Other implementations may perform the steps in different orders and/or with different, fewer or additional steps than the ones illustrated in FIG. 6. Multiple steps can be combined in some implementations. For convenience, this flowchart is described with reference to the system that carries out a method. The system is not necessarily part of the method.

The technology disclosed can include systems and methods for helping a sales engineer prepare to attend a sales meeting. At block 602, it can monitor the sales engineer's calendar on one or more user devices. It can further extract information related to an event such as the time, date, addresses, etc. of the event from the user devices.

At block 604, the technology disclosed can automatically assemble event-related information from various electronic sources as a trigger date is reached that is predicted to be useful during the sales meeting. For instance, if the sales engineer sets "1 Jan. 2013" as the trigger date for a sales conference and identifies the file systems in electronic sources such as his personal computer 214 and laptop computer 204, the technology disclosed can automatically assemble the most updated data files from the corresponding file systems F3 and F4 as the trigger date arrives.

At block 606, the technology disclosed can identify content related to a company at a sales meeting that was most recently accessed by a sales engineer. In some implementations, the technology disclosed can identify most recent information accessed from one or more devices such as a laptop computer 204, tablet computer 202, smartphone 212, etc. It can also receive user preferences from a user to query most recently used information from a particular device assigned by the sales engineer. In other implementations, the most recently used information can include content such as documents, images, videos, etc. so that the sales engineer can quickly and efficiently access information associated with an instant client.

At block 608, the technology disclosed can find recent new information related to a company present at a sales meeting including latest news articles, stock rates, etc. This information can help a sales engineer to stay updated with the recent activities of an instant client.

At block 610, the technology disclosed can find information linked to a company present at a sales meeting such as company's website, contact information, web mentions, etc.

At block 612, the technology disclosed can find pre-packaged information related to a company at a sales meeting from one or more electronic sources specified by a sales engineer. For instance, if the sales engineer has created a company related file folder or matter in his or her personal computer 214, the file systems holding the appropriate pre-packaged information can be identified from the directory addresses provided the sales engineer.

At block 614, the technology disclosed can crawl various person-related data sources such as access controlled application-programming interfaces (APIs), public internet and social networking sites to find any common social connections between the sales engineer and attendees at the sales meeting. In some implementations, access controlled APIs like Yahoo Boss, Facebook Open Graph, Twitter Firehose can provide real-time search data aggregated from numerous social media sources such as Yahoo, Facebook and Twitter. Invocations to access controlled APIs can initialize sorting, processing and normalization of person-related data. Public Internet can provide person-related data from public sources such as first hand websites, blogs, web search aggregators, and social media aggregators. Social networking sites can provide person-related data from social media sources such as Twitter, Facebook, LinkedIn, and Klout.

At block 616, the technology disclosed can present a sales engineer with communication records between the sales engineer and the company at the sales meeting. The communication records can include e-mails, phone calls, SMSs, etc. exchanged between the sales engineer and the company. In some implementations, the technology disclosed can filter these communication records based on a particular sales deal, event, individual, calendar event, etc. It can also receive user preferences from a user to search communication records from a user assigned device such as a smartphone or an email client like Outlook.

At block 618, the technology disclosed can assemble the found information as packages for unified access by the sales engineer. In some implementations, it can assemble the found information based on user preferences such as client type, location of the sales meeting, priority criteria, context of the sales meeting, product type, product lifecycle, contractual requirements, stages of a business deal, etc.

At block 620, the technology disclosed can store the packages in an on-demand system like Salesforce.com. These packages can be accessed by a plurality of devices ranging from sales engineer's personal computer 214 to his or her smartphone 212. This can allow the sales engineer to very efficiently use these packages on different devices during a sales meeting.

At block 622, the technology disclosed can identify other members of a sales team associated with the sales engineer or the sales meeting and forward packages to one or members based on a user assignment.

Location Based Meeting Packager

FIG. 7 is a flow chart 700 of one implementation of location based meeting packager. Other implementations may perform the steps in different orders and/or with different, fewer or additional steps than the ones illustrated in FIG. 7. Multiple steps can be combined in some implementations. For convenience, this flowchart is described with reference to the system that carries out a method. The system is not necessarily part of the method.

At block 702, the technology disclosed can identify location information associated with a sales meeting or any calendar event. The location information can include latitude and longitude co-ordinates of a user assigned venue. It can further present a user with this location information across a user interface through a GPS or GNSS application.

At block 704, the technology disclosed can automatically assemble event-related information from various electronic sources as a trigger date is reached that is predicted to be useful during the sales meeting. For instance, if the sales engineer sets "1 Jan. 2013" as the trigger date for a sales conference and identifies the file systems in electronic sources such as his personal computer 214 and laptop computer 204, the technology disclosed can automatically assemble the most updated data files from the corresponding file systems F3 and F4 as the trigger date arrives.

At block 706, the technology disclosed can identify content related to a company at a sales meeting that was most recently accessed by a sales engineer. In some implementations, the technology disclosed can identify most recent information accessed from one or more devices such as a laptop computer 204, tablet computer 202, smartphone 212, etc. It can also receive user preferences from a user to query most recently used information from a particular device assigned by the sales engineer. In other implementations, the most recently used information can include content such as documents, images, videos, etc. so that the sales engineer can quickly and efficiently access information associated with an instant client.

At block 708, the technology disclosed can find recent new information related to a company present at a sales meeting including latest news articles, stock rates, etc. This information can help a sales engineer to stay updated with the recent activities of an instant client.

At block 710, the technology disclosed can find information linked to a company present at a sales meeting such as company's website, contact information, web mentions, etc.

At block 712, the technology disclosed can find pre-packaged information related to a company at a sales meeting from one or more electronic sources specified by a sales engineer. For instance, if the sales engineer has created a company related file folder or matter in his or her personal computer 214, the file systems holding the appropriate pre-packaged information can be identified from the directory addresses provided the sales engineer.

At block 714, the technology disclosed can crawl various person-related data sources such as access controlled application-programming interfaces (APIs), public internet and social networking sites to find any common social connections between the sales engineer and attendees at the sales meeting. In some implementations, access controlled APIs like Yahoo Boss, Facebook Open Graph, Twitter Firehose can provide real-time search data aggregated from numerous social media sources such as Yahoo, Facebook and Twitter. Invocations to access controlled APIs can initialize sorting, processing and normalization of person-related data. Public Internet can provide person-related data from public sources such as first hand websites, blogs, web search aggregators, and social media aggregators. Social networking sites can provide person-related data from social media sources such as Twitter, Facebook, LinkedIn, and Klout.

At block 716, the technology disclosed can present a sales engineer with communication records between the sales engineer and the company at the sales meeting. The communication records can include e-mails, phone calls, SMSs, etc. exchanged between the sales engineer and the company. In some implementations, the technology disclosed can filter these communication records based on a particular sales deal, event, individual, calendar event, etc. It can also receive user preferences from a user to search communication records from a user assigned device such as a smartphone or an email client like Outlook.

At block 718, the technology disclosed can assemble the found information as packages for unified access by the sales engineer. In some implementations, it can assemble the found information based on user preferences such as client type, location of the sales meeting, priority criteria, context of the sales meeting, product type, product lifecycle, contractual requirements, stages of a business deal, etc.

At block 720, the technology disclosed can store the packages in an on-demand system like Salesforce.com. These packages can be accessed by a plurality of devices ranging from sales engineer's personal computer 214 to his or her smartphone 212. This can allow the sales engineer to very efficiently use these packages on different devices during a sales meeting.

At block 722, the technology disclosed can identify other members of a sales team associated with the sales engineer or the sales meeting and forward packages to one or members based on a user assignment.

Data Deployment for Offline Access

FIG. 8 is a flow chart 800 of one implementation of deploying event-related data for off-line access. Other implementations may perform the steps in different orders and/or with different, fewer or additional steps than the ones illustrated in FIG. 8. Multiple steps can be combined in some implementations. For convenience, this flowchart is described with reference to the system that carries out a method. The system is not necessarily part of the method.

The technology disclosed can include systems and methods for automatically deploying event-related data in time for off-line access during travel. At block 802, the technology disclosed can register a calendar event in a memory in response to a user selection across a user interface. In some implementations, the calendar event can specify one or more event attributes such as data related to the event, references to electronic sources storing the data related to the event, location of the event, time and date of the event, and attendees at the event.

At block 804, the technology disclosed can automatically determine a travel itinerary from the sales engineer's calendar. It can further calculate the required travel time to reach an event.

In some implementations, meeting packages can be created and transferred based on the amount of travel time and strength of signal connectivity. For example, if the travel time for an event is a week, the technology disclosed can automatically assemble the event-related data a week before the event at block 806. If the travel time for an event is few hours, then the event-related data can be assembled few hours before the event at block 806.

In some implementations, meeting packages can be created based on the strength of signal connectivity. A sales engineer can provide an estimate of the signal connectivity during various stages of his or her travel. The event-related data with large file sizes such as legal documents can be transferred during a high connectivity period like overnight upload and the small data files such as common social connections can be deployed during the day over a cellular network.

The technology disclosed can customize transfer of event-related data based on future dates or events. In some implementations, data transfer of varying amounts can be made based on the imminence of an event. For example, large amounts of data transfer can be automatically made as an important event approaches.

The technology disclosed can include a metric that represents the degree of changes made to data uploaded to an electronic source. In some implementations, when the degree of changes cross a user assigned threshold, the technology disclosed can suggest the sales engineer to make another upload so as to maintain the most updated data.

At block 808, the technology disclosed can deploy the event-related data to one or more user assigned devices or sources such as a tablet computer 202, cloud storage 203, laptop computer 204, smartphone 212, personal computer 214, and personal digital assistant 223. In some implementations, the event-related data can be transferred based on the size, type, priority, usage, status, etc. of the event-related data files.

At block 810, the technology disclosed can automatically transfer the event-related data from a first source to a supplement source before reaching a memory limit on the first source. In some implementations, the data transfer can be based on a user-assigned criteria such as priority, usage, status, and size of the data files.

At block 812, the technology disclosed can determine one or more event-related data files in at least one device with least priority based on user preferences. It can then automatically remove the event-related data files with least priority from the device at block 814, if the device has reached a user assigned memory limit.

At block 816, the technology disclosed can determine one or more least used event-related data files in at least one device. It can then automatically remove the least used event-related data files from the device at block 814, if the device has reached a user assigned memory limit.

Some Particular Implementations

The technology disclosed may be practiced as a method or system adapted to practice the method.

In one implementation, a method is described for helping a sales engineer prepare to attend a sales meeting. The method includes monitoring the sales engineer's calendar and automatically assembling information available from electronic sources as a trigger date is reached that is predicted to be useful during the sales meeting. It further includes finding most recently used information that links to the sales meeting, finding recent new information related to a company at the sales meeting, finding information linked to attendees at the sales meeting, finding pre-packaged company or division information, finding social connections between the sales engineer and attendees at the sales meeting, and finding communication records between the sales engineer and attendees at the sales meeting. The method also includes assembling information found as packages and storing the packages in an on-demand system accessible by a plurality of devices.

This method and other implementations of the technology disclosed can each optionally include one or more of the following features and/or features described in connection with additional methods disclosed.

The method also includes automatically allocating the found information to the plurality of devices as per a user assignment. It further includes the user assignment is provisioned based on file type, file priority, file usage, file status and file size. It also includes routing portions of information to other members of a sales team.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a method is described for helping a sales engineer prepare to attend a sales meeting. The method includes monitoring the sales engineer's location and automatically assembling information available from electronic sources as a trigger date is reached that is predicted to be useful during the sales meeting. It further includes finding most recently used information that links to the sales meeting, finding recent new information related to a company at the sales meeting, finding information linked to attendees at the sales meeting, finding pre-packaged company or division information, finding social connections between the sales engineer and attendees at the sales meeting, and finding communication records between the sales engineer and attendees at the sales meeting. The method also includes assembling information found as packages and storing the packages in an on-demand system accessible by a plurality of devices.

This method and other implementations of the technology disclosed can each optionally include one or more of the following features and/or features described in connection with additional methods disclosed.

The method also includes the location being set in response to a user selection across a user interface, which is triggered on its real-time GPS reporting enabled in at-least one of the plurality of devices. It further includes automatically allocating the found information to the plurality of devices as per a user assignment.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In yet another implementation, a method is described for automatically deploying event-related data in time for offline access during travel. It can include registering a calendar event in a memory in response to a user selection across a user interface, wherein the calendar event specifies one or more event attributes. It also includes automatically determining a travel itinerary from the calendar and required travel time to reach an event, automatically assembling event-related data from the electronic sources based on the event attributes, and automatically deploying the event-related data to a plurality of user-assigned devices as a trigger date is reached in advance of travel to the event.

This method and other implementations of the technology disclosed can each optionally include one or more of the following features and/or features described in connection with additional methods disclosed.

The method further describes the event attributes to include data related to the event, references to electronic sources storing the data related to the event, location of the event, time and date of the event, and attendees at the event. It further includes automatically transferring event-related data from a first source to a supplement source before reaching a memory limit on the first source based on a user-assignment. The user-assignment includes a memory available on source criteria, file type criteria, file priority criteria, file usage criteria, and file status criteria.

The method further includes determining one or more event-related data files in at least one device with least priority based on user preferences and automatically removing the event-related data files with least priority from the device if the device has reached a user assigned memory limit.

The method further includes determining one or more least used event-related data files in at least one device and automatically removing the least used event-related data files from the device if the device has reached a user assigned memory limit.

What is claimed is:

1. A method comprising:

identifying an event location associated with a calendar event;

determining that a location of a first device has changed to be within a distance threshold of the event location based on real-time GPS reporting enabled in the first device, wherein the first device is associated with a user;

assembling information based upon the determining that the location of the first device has changed, wherein the assembled information is predicted to be useful during the calendar event, and available from electronic sources;

storing the assembled information in an on-demand system accessible by a plurality of devices over the Internet;

determining, prior to transferring the assembled information to the first device, a memory limits table indicating a memory limit of the first device upon which to begin transferring the assembled information to a second device, wherein both the first device and the second device are local to the user;

transferring a first portion of the assembled information to the first device;

determining, responsive to the transferring, that the first device has reached the indicated memory limit;

transferring a second portion of the assembled information to the second device based on the determination that the first device has reached the memory limit, wherein both the first device and the second device are configured to provide local, offline access to the transferred first portion and the transferred second portion of the assembled information; and providing, for display, a customer interface including graphical representations of the assembled information associated with the calendar event.

2. The method of claim 1, further comprising:
automatically allocating the first portion and the second portion of the assembled information to the plurality of devices in accordance with the memory limits table as indicated by the user, wherein the allocation is based on one or more of file type, file priority, file usage, file status and file size.

3. The method of claim 2, further comprising:
routing subsets of the assembled information to one or more devices associated with other members of a sales team as indicated by the memory limits table.

4. A method comprising:
identifying an event location associated with a calendar event;
monitoring a location of a first device relative to the event location;
determining that the location of the first device has changed to be within a distance threshold of the event location, wherein the first device is associated with a user;
assembling information associated with the calendar event based on criteria specified by the user of the first device based upon the determining that the location of the first device has changed, wherein the information is available from electronic sources assembling the information into a package;
storing the package in a system accessible by a plurality of devices, wherein reaching the distance threshold is determined with real-time GPS reporting enabled in at-least one of the plurality of devices;
determining, prior to transferring the assembled information to the first device, a memory limits table indicating a memory limit of the first device upon which to begin transferring the assembled information to a second device, wherein both the first device and the second device are local to the user;
transferring a first portion of the assembled information to the first device;
determining, responsive to the transferring, that the first device has reached the indicated memory limit;
transferring a second portion of the assembled information to the second device based on the determination that the first device has reached the memory limit, wherein both the first device and the second device are configured to provide local, offline access to the transferred first portion and the transferred second portion of the assembled information; and
providing, for display, a customer interface including graphical representations of one or more of the packages.

5. The method of claim 4, wherein the distance threshold is set in response to a selection across a user interface.

6. A computer system comprising:
a processor and a computer readable storage medium storing computer instructions configured to cause the processor to:
identify an event location associated with a calendar event;
determine that a location of a first device associated with a user has changed to be within a distance threshold of the event location based on real-time GPS reporting enabled in the first device;
assemble information based upon the determining that the location of the first device has changed, wherein the assembled information is predicted to be useful during the calendar event, and available from electronic sources;
store the assembled information in an on-demand system accessible by a plurality of devices over the Internet;
determine, prior to transferring the assembled information to the first device, a memory limits table indicating a memory limit of the first device upon which to begin transferring the assembled information to a second device, wherein both the first device and the second device are local to the user;
transfer a first portion of the assembled information to the first device;
determine, responsive to the transferring, that the first device has reached the indicated memory limit;
transfer a second portion of the assembled information to the second device based on the determination that the first device has reached the memory limit, wherein both the first device and the second device are configured to provide local, offline access to the transferred first portion and the transferred second portion of the assembled information; and
provide, for display, a customer interface including graphical representations of the assembled information associated with the calendar event.

7. The system of claim 6, further configured to cause the processor to:
automatically allocate the first portion and the second portion of the assembled information to the plurality of devices as indicated by the user.

8. The system of claim 6, further configured to cause the processor to:
route subsets of the assembled information to one or more devices associated with other members of a sales team as indicated by the memory limits table.

9. A computer system comprising:
a processor and a computer readable storage medium storing computer instructions configured to cause the processor to:
identify an event location associated with a calendar event;
monitor a location of a first device relative to the event location;
determine that the location of the first device has changed to be within a distance threshold of the event location, wherein the first device is associated with a user;
assemble information associated with the calendar event based on criteria specified by the user of the first device based upon the determining that the location of the first device has changed, wherein the information is available from electronic sources assembling the information into a package;
store the package in a system accessible by a plurality of devices, wherein reaching the distance threshold is determined with real-time GPS reporting enabled in at least one of the plurality of devices;
determine, prior to transferring the assembled information to the first device, a memory limits table indicating a memory limit of the first device upon which to begin transferring the assembled information to a second device, wherein both the first device and the second device are local to the user;
transfer a first portion of the assembled information to the first device;

determine, responsive to the transferring, that the first device has reached the indicated memory limit;

transfer a second portion of the assembled information to the second device based on the determination that the first device has reached the memory limit, wherein both the first device and the second device are configured to provide local, offline access to the transferred first portion and the transferred second portion of the assembled information; and provide, for display, a customer interface including graphical representations of one or more of the packages.

10. The method of claim 4, wherein the one or more criteria specified by the user comprises a usage indicator that indicates the plurality of files are assembled based on a frequency of usage by the user, wherein a set of most frequently used files are transferred to the first device, and less frequently used files are transferred to the second device.

11. The method of claim 1, further comprising:

finding most recently used information that links to the calendar event, wherein the calendar event is a sales meeting;

finding information linked to the attendees of the sales meeting;

identifying social handles of social networking sites belonging to a user associated with the first device and the attendees of the sales meeting and identifying social connections, from the social networking sites, that are common between the user and the attendees of the sales meeting;

finding communication records including communications exchanged between the user and the attendees of the sales meeting; and assembling at least a portion of the social connections and the communication records with the package.

12. The method of claim 4, wherein an information type indicator indicates a particular file type, and wherein the at least one of the first portion or the second portion of the assembled information comprises one or more files of the particular file type.

13. The method of claim 1, wherein the on-demand system is configured to perform both the transferring the first portion comprising a first set of files of the assembled information and the transferring the second portion comprising a second set of files of the assembled information, and wherein the first set of files are different from the second set of files.

14. The method of claim 1, wherein the memory limit is provided by the user.

* * * * *